United States Patent
Gofer

[11] Patent Number: 5,431,823
[45] Date of Patent: Jul. 11, 1995

[54] PROCESS FOR SUPPORTING AND CLEANING A MESH ANODE BAG

[75] Inventor: Alexander Gofer, Jerusalem, Israel

[73] Assignee: Electric Fuel(E.F.L.) Ltd., Jerusalem, Israel

[21] Appl. No.: 292,467

[22] Filed: Aug. 18, 1994

[51] Int. Cl.⁶ .............................................. B01D 15/08
[52] U.S. Cl. ............................ 210/636; 210/500.36; 210/500.38; 210/791; 210/797; 210/409; 204/282; 204/283; 204/295; 429/131; 15/304
[58] Field of Search ............... 204/282, 283, 197, 148, 204/295, 282; 429/131, 132, 136, 246; 15/304, 395; 205/261, 305; 210/636, 791, 797, 500.36, 500.38, 332, 333.01, 407, 409, 411, 412

[56] References Cited

U.S. PATENT DOCUMENTS

| | | | |
|---|---|---|---|
| 2,333,713 | 11/1943 | Eiben | 15/304 |
| 3,200,055 | 8/1965 | Scacciati | 204/282 |
| 3,467,586 | 9/1969 | Grotheer et al. | 204/295 |
| 3,988,223 | 10/1976 | Hirozawa | 204/295 |
| 4,075,069 | 2/1978 | Shinohara et al. | 204/282 |
| 4,201,653 | 5/1980 | O'Neill et al. | 204/282 |
| 4,328,076 | 5/1982 | Fisher et al. | 204/282 |
| 4,329,217 | 5/1982 | Byrd et al. | 204/282 |
| 4,356,076 | 10/1982 | Matsushita et al. | 204/282 |
| 4,367,147 | 1/1983 | Asami et al. | 210/636 |
| 4,526,904 | 7/1985 | Kishida et al. | 521/26 |
| 4,624,760 | 11/1986 | Pottinger et al. | 210/636 |
| 4,820,351 | 4/1989 | Hambleton et al. | 15/304 |
| 5,133,843 | 7/1992 | Eisman | 210/638 |
| 5,305,493 | 4/1994 | Prenn | 15/304 |
| 5,312,533 | 5/1994 | Mayr et al. | 204/282 |
| 5,318,861 | 6/1994 | Harats et al. | 429/21 |

Primary Examiner—Matthew O. Savage
Assistant Examiner—Robert James Popovics
Attorney, Agent, or Firm—Helfgott & Karas

[57] ABSTRACT

The invention provides a process for supporting and cleaning a mesh anode bag of the type having one open end, one closed end, and being sealed along its lateral sides, the bag containing particles of discharged active zinc therein along its inner surfaces after the separation thereof from a discharged zinc anode, the process comprising placing the bag over a device comprising a hollow body having a liquid inlet at a first end and a plurality of liquid outlets at a second opposite end, the device being contoured and sized to be overridden by the bag, with the inner surfaces of the bag being in proximity to the outer surfaces of the body, and the plurality of outlets adjacent to the closed end of the bag, causing a flow of liquid via the inlet and through the body to the outlets, whereby liquid passing through the outlets flows around the outer surface of the body and along the inner surfaces of the bag, to entrain and remove therefrom the particles of zinc, and separating the bag from the device, as well as providing the device for use therein.

2 Claims, 2 Drawing Sheets

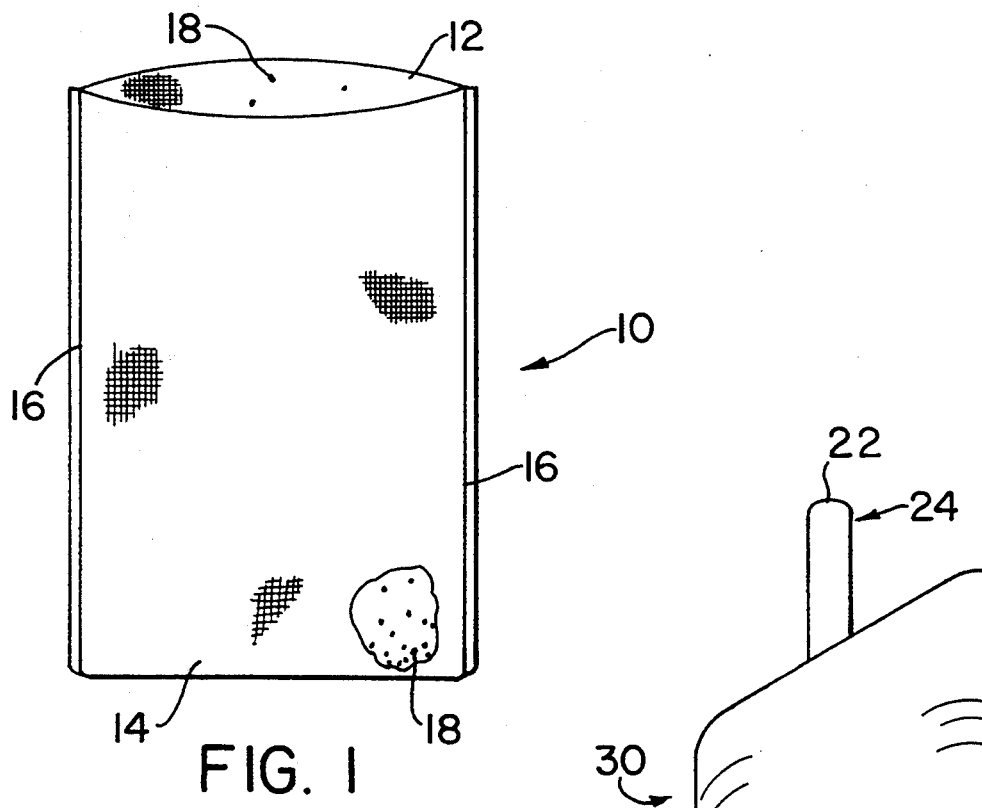
FIG. 1
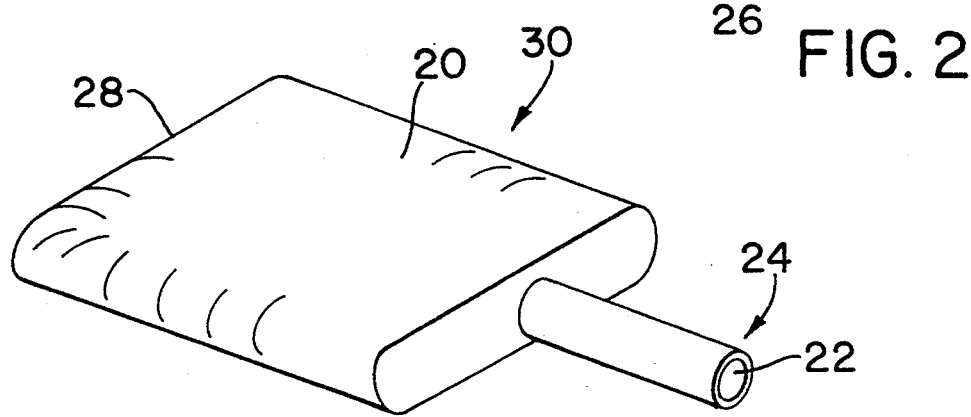
FIG. 2
FIG. 3

PROCESS FOR SUPPORTING AND CLEANING A MESH ANODE BAG

The present invention relates to a process and a device for cleaning an anode bag to enable the reuse thereof.

More particularly, the present invention relates to mechanically-rechargeable, electrochemical multi-cell zinc-air batteries, each cell containing at least one zinc anode enclosed in a fine porous separator bag. Typically, said bags are woven out of a fine polymeric yarn. The present invention relates to a device and method for cleaning such a bag of particles of discharged active zinc retained therein after the separation of said bag from the replaceable discharged zinc anode, so that the bag can be reused as an enclosing separator bag for a fresh zinc anode.

The advantages of mechanically rechargeable metal-air batteries used for the propulsion of road vehicles have been discussed in U.S. patent application Ser. No. 08/122,788, the teachings of which are incorporated herein by reference. Such batteries are recharged within a short time span by removing and replacing the cell anodes, as well as by making any necessary corrections in the quantity and composition of the electrolyte, usually an aqueous KOH solution, as described in U.S. patent application Ser. No. 08/088,543; now U.S. Pat. No. 5,378,329.

A battery for vehicle propulsion may have 200–600 cells. Any commercially economic mechanical recharging system will therefore provide for fast, convenient and safe removal and replacement of battery anodes, as described in said earlier applications.

In our U.S. patent application Ser. No. 08/002,656; now U.S. Pat. No. 5,318,861 filed Jan. 11, 1993, there is described a metal electrode cassette which comprises a central anode element enveloped by a pair of removable separators. It was further found to be beneficial to make said separators from non-woven, woven, or expanded material, having a pore or mesh size chosen to restrict migration of zinc particles that may detach from the anode and otherwise short-out to the cathode, and yet having enough open spaces to minimize ohmic losses at normal and high current drains. Also, the separators should possess adequate mechanical strength to remain unchanged during anode replacement. We found that a fairly fine anode bag of non-woven, woven, or expanded mesh (200–400 mesh) is an asset to retain and transfer debris from the cell during refueling, in the case of occasional shedding of pieces from an anode.

Preferably, said mesh bag separator is made of a woven or expanded polymeric material selected from the group consisting of a long chain synthetic polymeric amide and polypropylene.

Notably, nylon and polypropylene are low-cost materials which have shown good stability in the alkaline environment of the zinc-air cell (aqueous 30 wt. % KOH from $-30°$ C. to $+80°$ C.).

Presently it is economically and ecologically important to reuse the spent anode bag for a fresh anode. It has been found that, after separation of a spent anode from its bag, a small quantity of fine particles of discharged active zinc, which have become separated from the anode during its operation, remain in the bag. It is advantageous to remove such particles before reusing the bag, as said particles may become lodged in and block the bag's air passages. In extreme cases, such particles could form aggregates, which could tear the bag mesh and could possibly cause a short circuit if they contact the nearby cell cathode.

As is to be expected, the fine particles which originate from the inner side of the bag are also more easily removed therefrom. It would be possible to turn said bag inside-out, to apply the chosen cleaning process, and thereafter to re-turn the bag. This procedure, however, is quite time-consuming, difficult to automate, and may cause premature wear to the bag fabric and/or seams.

Also to be avoided is the application of any substantial gas or hydraulic pressure to the inner part of the bag, as such pressure is likely to result in the wedging of zinc particles into the fine fabric pores, making their removal more diffcult and uncertain.

It is therefore one of the objects of the present invention to provide a quick, effective, non-damaging method for cleaning anode bags.

The present invention achieves the above objective by providing a process for supporting and cleaning a mesh anode bag of the type having one open end, one closed end, and being sealed along its lateral sides, said bag containing particles of discharged active zinc therein along its inner surfaces after the separation thereof from a discharged zinc anode, said process comprising placing said bag over a device comprising a hollow body having a liquid inlet at a first end and a plurality of liquid outlets at a second opposite end, said device being contoured and sized to be overridden by said bag, with the inner surfaces of said bag being in proximity to the outer surfaces of said body, and said plurality of outlets adjacent to said closed end of said bag; causing a flow of liquid via said inlet and through said body to said outlets; and separating said bag from said device; whereby liquid passing through said outlets flows around the outer surface of said body and along the inner surfaces of said bag, to entrain and remove therefrom said particles of zinc.

As will be realized, the anode bags can be of the type formed by superposing two sheets and seaming them along three edges. Alternatively, such bags can be formed from a continuous tube cut into bag-size segments and sealed at one end. Similarly, said bags can be formed from a sheet of bag-forming material folded over itself and then sealed to leave one open end. The formation of the bag is, however, not part of the present invention, and the process and device of the present invention are applicable for cleaning any of the above-mentioned types of bags.

It is a further object of the present invention to provide a device allowing application of said method.

The invention achieves said further objective by providing a device for supporting and cleaning a mesh anode bag of the type having one open end, one closed end, and being sealed along its lateral sides, said bag containing particles of discharged active zinc therein along its inner surfaces after the separation thereof from a discharged zinc anode, said device comprising a hollow body having a liquid inlet at a first end and a plurality of liquid outlets at a second, opposite end, said device being contoured and sized to be overridden by said bag, with the inner surfaces of said bag being in proximity to the outer surfaces of said body, and said plurality of outlets being adjacent to said closed end of said bag; and means for causing a flow of liquid via said inlet and through said body to said outlets; whereby liquid passing through said outlets flows around the outer surface of said body and along the inner surfaces of said bag, to entrain and remove therefrom said particles of zinc.

It will be realized that the novel bag-cleaning method and device of the present invention form a small but important part of the larger system which must be constructed to implement the economic use of mechanically refuelable metal-air batteries for the electric propulsion of road vehicles, and particularly with regard to the fast and economical recharging of such batteries.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective, fragmented view of an anode bag of the type referred to in the present invention;

FIGS. 2 and 3 are perspective views of the device of the present invention, and

Figure 4:
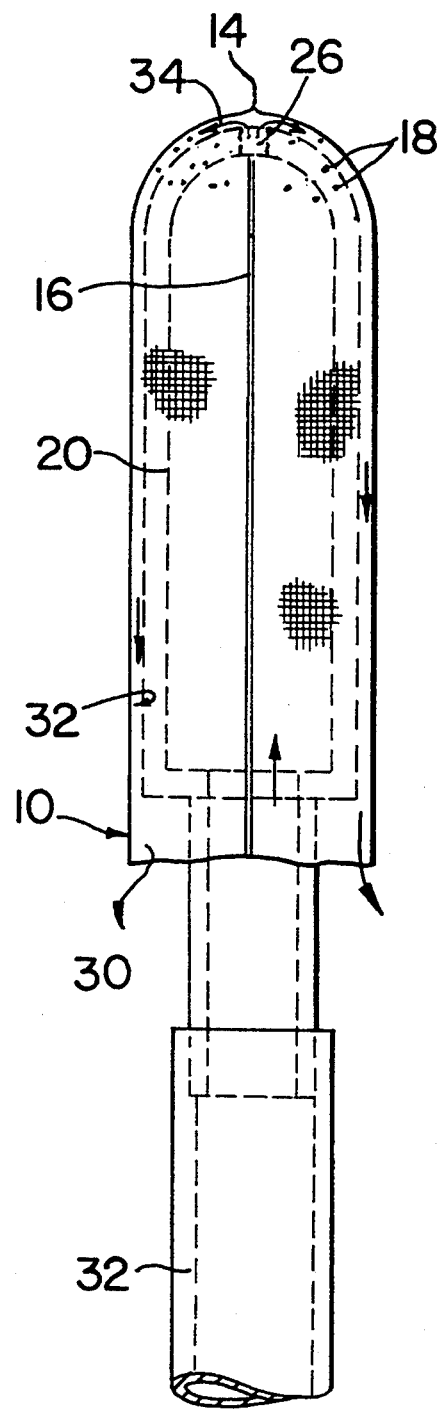
FIG. 4 is a side view of said device in use for cleaning an anode bag.

There is seen in FIG. 1 a mesh anode bag 10 of the type having one open end 12, one closed end 14, and being sealed along its lateral sides 16. Each wall of the bag 10 has a thickness of between 40 to 130 microns, a mesh size of between 200–500 holes per inch, and an open area of between 15–40%. Bag 10 is suitably made of a material such as a long-chain synthetic polymeric amide, or polypropylene.

The bag 10 shown has been separated from a spent zinc anode, and now contains particles 18 of discharged active zinc therein along its inner surfaces. The bag 10 thus requires cleaning before reuse.

Referring now to FIGS. 2 and 3, there is seen a device 30 comprising a hollow body 20 having a liquid inlet 22 at a first end 24 and a plurality of liquid outlets 26 at a second, opposite end 28. Preferably, the combined cross-sectional area of outlets 26 is equal to or greater than the cross-sectional area of the inlet 22. However, the device 30 also gives good results when the cross-sectional area of inlet 22 is up to 10% greater than the combined cross-sectional area of outlets 26.

A device made according to the following dimensions has been found to give good results:

|  | Aperture Diameter (mm) | Aperture Area (mm$^2$) | Number of Apertures | Total Area (mm$^2$) |
| --- | --- | --- | --- | --- |
| Inlet | 24 | 452 | 1 | 452 |
| Outlet | 6.7 | 35.3 | 12 | 424 |

Area Ratio Inlet/Outlet: 1.07

The body 20 can suitably be made of a thermoplastic such as nylon, PVC or polypropylene, and is connected to means such as a pipe 32, for causing a flow of liquid 34, such as low-pressure water or KOH solution, through inlet 22 and body 20 to outlets 26.

Device 30 is contoured and sized to be overridden by bag, as shown in FIG. 4.

FIG. 4 shows device 30 in operation. Liquid 34, passing through outlets 26, flows around the outer surfaces of body 20 and along the inner surfaces of bag 10. The liquid 34 entrains and removes from the bag particles 18 of zinc. Advantageously, a space of between 1-8 mm remains between the outer surfaces of body 20 and the inner surfaces 32 of bag 10. The inner surfaces 32 of bag 10 may be in proximity to the outer surfaces of body 20, provided the flow of particle-containing liquid is not obstructed.

As can be seen in FIG. 4, the plurality of outlets 26 are adjacent to the closed end 14 of bag 10, a vicinity where particles 18 are lodged before the bag is cleaned; however, closed end 14 is normally seamed, and therefore the flow of liquid in said area does not result in particles being caught in the mesh.

The present invention also provides a process for supporting and cleaning a mesh anode bag of the type having one open end, one closed end, and being sealed along its lateral sides, said bag containing particles of discharged active zinc therein along its inner surfaces, after the separation thereof from a discharged zinc anode.

The process comprises the following steps:

1) The anode bag is placed over a device comprising a hollow body having a liquid inlet at a first end thereof and a plurality of liquid outlets at a second, opposite end, said device being contoured and sized to be overridden by said bag, with the inner surfaces of said bag being in proximity to the outer surfaces of said body, and said plurality of liquid outlets adjacent to said closed end of said bag.

2) A liquid, for example, water or aqueous KOH solution, is flowed via said inlet and through said body to said outlets, whereby liquid passing through said outlets flows around the outer surface of said body and along the inner surfaces of said bag, to entrain and remove said particles of zinc therefrom.

There is some advantage in using a liquid such as an alkaline solution, which will attack the particles to be removed. Such a liquid, particularly if hot and/or of high concentration, may even dissolve the smaller zinc particles or at least reduce their size so as to free them from jamming in the fabric spaces.

3) The bag is separated from the device.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for supporting and cleaning a mesh anode bag having one open end, one closed end, and being sealed along its lateral sides, said bag containing particles of discharged active zinc therein along its inner surfaces after the separation thereof from a discharged zinc anode, said process comprising:

placing said bag over a device comprising a hollow body having a liquid inlet at a first end and a plurality of liquid outlets at a second opposite end, said device being contoured and sized to be overridden by said bag, with the inner surfaces of said bag being in proximity to the outer surfaces of said body, and said plurality of outlets adjacent to said closed end of said bag;

causing a flow of liquid via said inlet and through said body to said outlets, whereby liquid passing through said outlets flows around the outer surface of said body and along the inner surfaces of said bag, to entrain and remove therefrom said particles of zinc, and separating said bag from said device.

2. The process as claimed in claim 1, wherein said liquid is water or an alkaline solution.

* * * * *